United States Patent [19]
Nakajima

[11] Patent Number: 5,216,706
[45] Date of Patent: Jun. 1, 1993

[54] COMMUNICATION APPARATUS HAVING REMOTE CONTROL OPERATION MODE

[75] Inventor: Masato Nakajima, Yokohama, Japan

[73] Assignee: Ricoh Company, Ltd., Tokyo, Japan

[21] Appl. No.: 731,479

[22] Filed: Jul. 17, 1991

[30] Foreign Application Priority Data

Jul. 19, 1990 [JP] Japan .................... 2-192212

[51] Int. Cl.⁵ .................... H04M 11/00; H04N 1/32
[52] U.S. Cl. .................... 379/100; 379/95; 379/102; 379/105
[58] Field of Search .................... 379/100, 95, 102, 105, 379/97, 96, 98, 93

[56] References Cited
U.S. PATENT DOCUMENTS

| | | | |
|---|---|---|---|
| 4,546,213 | 10/1985 | Dick | 379/95 |
| 4,918,722 | 4/1990 | Duehren et al. | 379/100 |
| 4,935,955 | 6/1990 | Neudorfer | 379/100 |
| 4,985,919 | 1/1991 | Naruse et al. | 379/95 |
| 5,093,856 | 3/1992 | Atkinson et al. | 379/95 |

Primary Examiner—James Dwyer
Assistant Examiner—Stella L. Woo
Attorney, Agent, or Firm—Oblon, Spivak, McClelland, Maier & Neustadt

[57] ABSTRACT

A facsimile machine has a remote control operation mode in which functions in the facsimile machine are remotely activated based on an ID code supplied from a remote telephone terminal. The facsimile machine includes a memory which stores the ID code, and controller a having a first function for determining whether or not an erroneous ID code which differs from the ID code stored in the memory is supplied from the remote telephone terminal, a second function for counting a number of times that the erroneous ID code is supplied from the remote telephone terminal based on a first determination result obtained by the first function, and a third function for determining whether or not the remote control operation mode can be activated based on the number of times counted by the second function. The remote control operation mode is prohibited from being used in the facsimile machine when the third function has determined that the remote control operation mode cannot be activated.

9 Claims, 4 Drawing Sheets

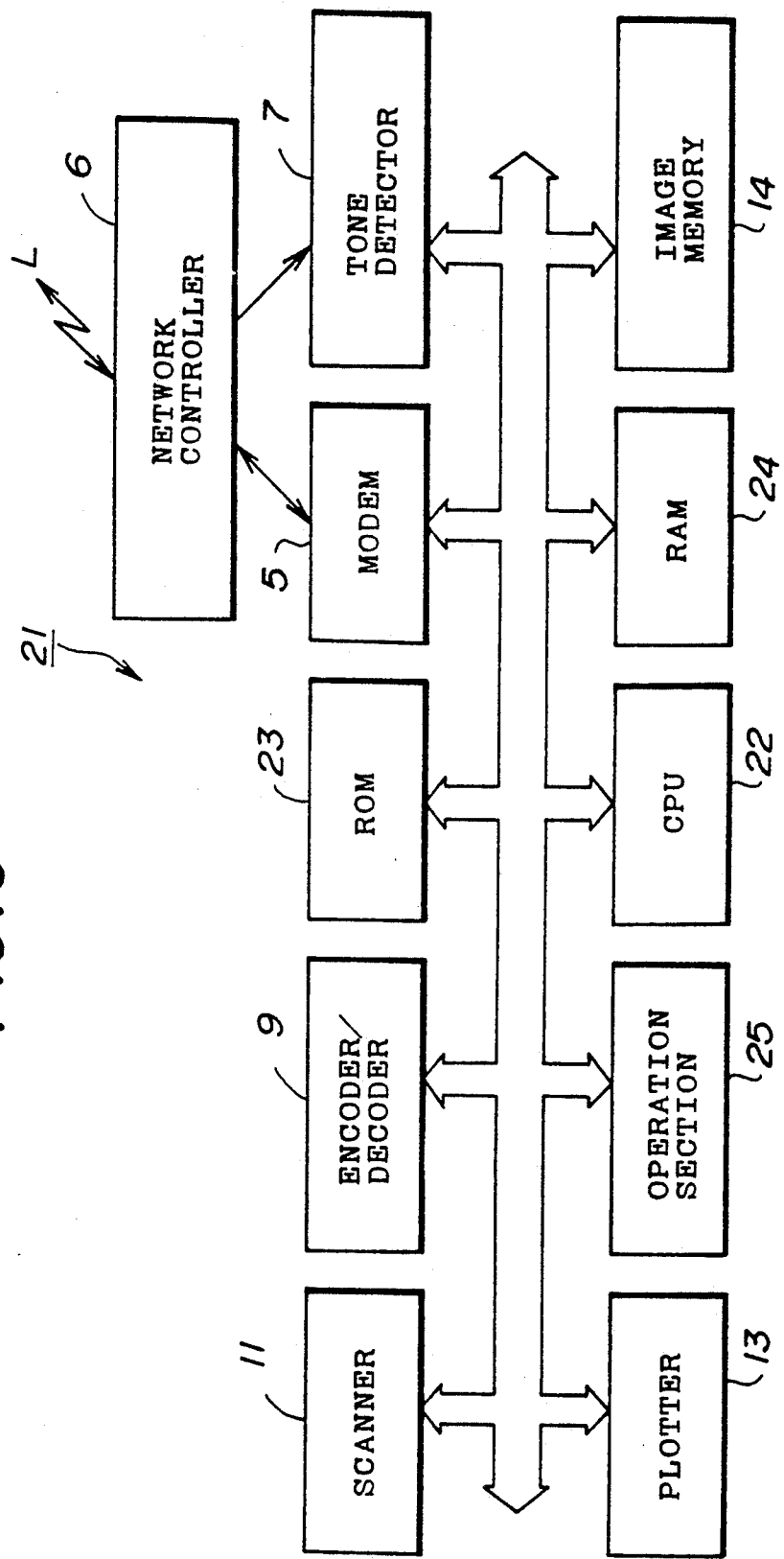

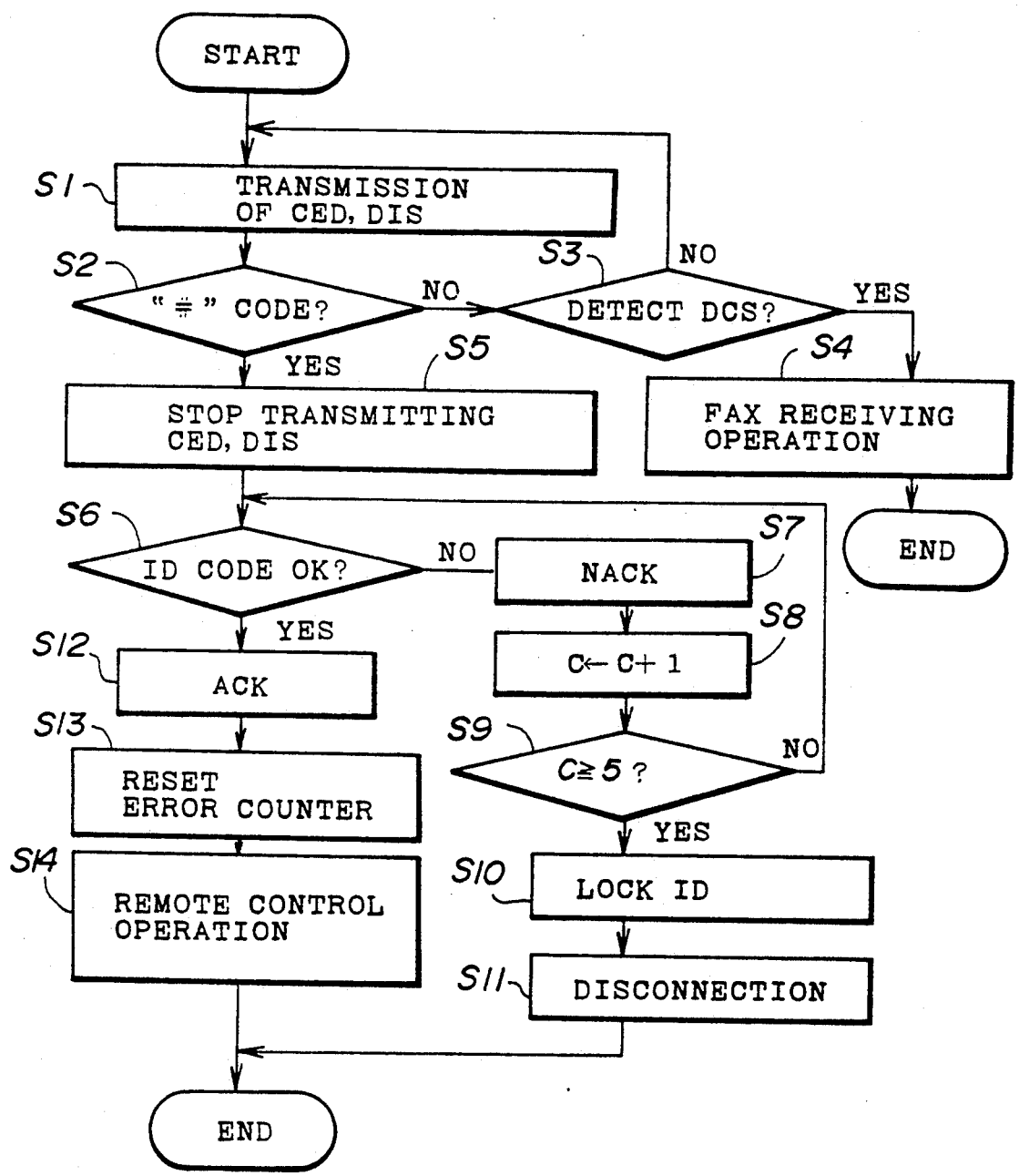

COMMUNICATION APPARATUS HAVING REMOTE CONTROL OPERATION MODE

BACKGROUND OF THE INVENTION

The present invention generally relates to a communication apparatus, such as a facsimile machine, and more particularly to a communication apparatus which has a remote control operation mode activated by a password which is supplied from a remote terminal.

Recently, the number of functions provided on a telephone has been increasing, and a telephone having a remote control operation mode, in which respective functions can be controlled based on a predetermined DTMF (Dual Tone Multifrequency) signal transmitted from a remote telephone terminal, has been proposed.

Conventionally, these types of telephones are disclosed, for example, in Japanese Utility Model Laid Open Publication Nos.63-181043 and 63-185342.

In the former, a calling operation, an on-hook operation and an off-hook operation in a telephone can be activated based on a password represented by the DTMF signal supplied from a remote telephone terminal. In the latter, electrical appliances are remotely controlled based on a password represented by the DTMF signal which is transmitted via the telephone line.

The above remote control, which is activated based on the password, can be used in a facsimile machine having a telephone. For example, information stored in the facsimile can be read out by remote control. In this case, as the remote control is activated based on a password, unspecified users can be prevented from obtaining the information in the facsimile machine.

However, in the facsimile machine in which the remote control can be activated based on the password, by repeatedly trying different passwords, the correct password can be discovered. That is, it is difficult to keep the information in the facsimile machine having a remote control operation mode secret by only the password. Thus, the security of the facsimile having the remote control operation mode deteriorates.

SUMMARY OF THE INVENTION

Accordingly, a general object of the present invention is to provide a novel and useful communication apparatus in which the disadvantages of the aforementioned prior art are eliminated.

A specific object of the present invention is to provide a communication apparatus having a remote control operation mode in which the security thereof can be improved.

The above objects of the present invention are achieved by a communication apparatus having a remote control operation mode in which functions in the communication apparatus are remotely activated based on a predetermined code supplied from an external terminal, the communication apparatus comprising: storage means for storing the code data; first determination means, coupled to the storage means, for determining whether or not an erroneous code which differs from the code stored in the storage means is supplied from the external terminal; counter means, coupled to the first determination means, for counting a number of times that the erroneous code is supplied from the external terminal based on a first determination result obtained by the first determination means; and second determination means, coupled to the counter means, for determining whether or not the remote control operation mode can be activated based on the number of times counted by the counter means, wherein the remote control operation mode is prohibited from being used in the communication apparatus when the second determination means has determined that the remote control operation mode cannot be activated.

According to the present invention, when the number of times that the erroneous codes are supplied reaches a predetermined number, the remote control operation mode is prohibited from being used. Thus, the security of the communication apparatus can be improved.

Additional objects, features and advantages of the present invention will become apparent from the following detailed description when read in conjunction with the accompanying drawings.

BRIEF DESCRIPTION OF THE DRAWINGS

FIG. 3 is a block diagram illustrating a facsimile machine according to a second embodiment of the present invention; and FIG. 4 is a flow chart illustrating a protecting process carried out along with a remote control operation in the facsimile machine shown in FIG. 3.

DESCRIPTION OF PREFERRED EMBODIMENTS

A description will now be given of a first embodiment of the present invention with reference to FIGS. 1 and 2.

Figure 1:
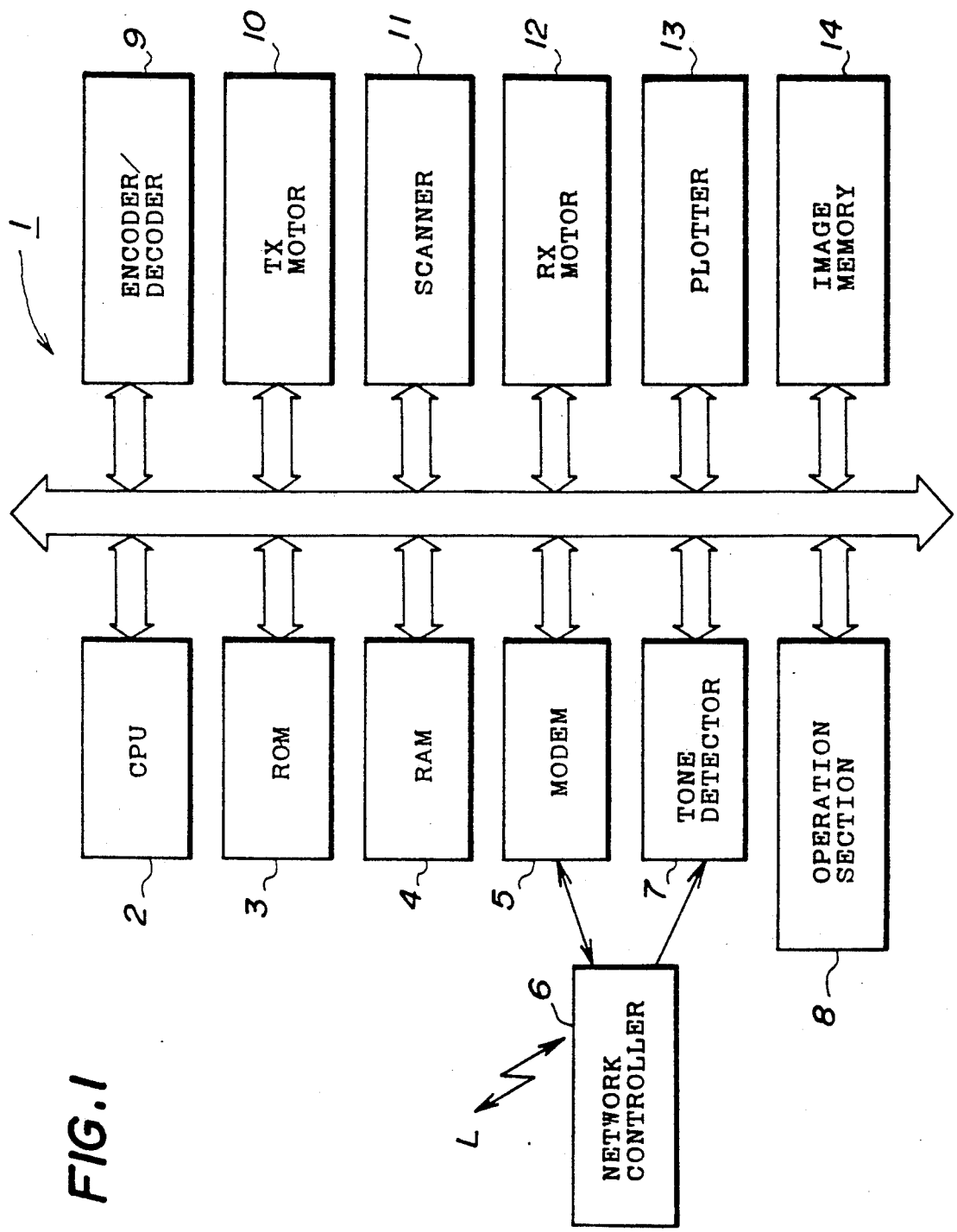
FIG. 1 is a block diagram illustrating a facsimile machine according to a first embodiment of the present invention.

FIG. 1 shows a facsimile machine 1 according to the first embodiment. The facsimile machine 1 has a CPU (Central Processing Unit) 2, a ROM (Read Only Memory) 3, a RAM (Random Access Memory) 4, a modem 5, a tone detector 7, an operation section 8, an encoder/decoder 9, a TX-motor 10, a scanner 11, an RX-motor 12, a plotter 13, and an image memory 14, which are connected to a bus. The facsimile machine 1 also has a network controller 6 connected to the modem 5 and the tone detector 7.

The CPU 2 sequentially carries out a process of a facsimile communication in accordance with programs stored in the ROM 3. The CPU 2 also carries out a protecting process when a remote control operation is activated, as will be described later. The ROM 3 stores various programs which are used by the CPU 2. The RAM 4 is provided with working areas which the CPU 2 uses while executing the processes. The RAM 4 stores data of telephone numbers and names of destinations, and an ID code which is used for activating the remote control operation mode. The modem 5 modulates and demodulates image signals in the facsimile communication. The network controller 6 is connected to the subscriber's telephone line L and carries out a facsimile communication process with respect to a party in accordance with a predetermined procedure. The tone detector 7 determines a type of tone signal represented by the DTMF signal which is supplied via the public telephone line L and the network controller 6. The tone detector 7 transmits the determining result thereof to the CPU 2. The operation section 8 has a ten key board and various key switches. An operator operates keys on the ten key board and/or the key switches so that various instructions are supplied to the facsimile machine 1. The operation section 8 supplies the instructions input thereby to respective parts of the facsimile machine. For example, a phone number corresponding to a predetermined function key is recorded in the RAM 4 by use of the ten key board, the function key and the like. Then, due to only the operation of one function key, a destination identified by the phone number recorded in the RAM 4 is called. That is, a one-touch key operation is carried out.

The encoder/decoder 9 encodes an image signal which is transmitted to the destination, and decodes an image signal which is received via the subscriber's telephone line L. A document set on the facsimile machine 1 is fed to the scanner 11 at a predetermined speed by the TX-motor 10. The scanner 11 has a CCD (Charge Coupled Device) optical sensor. The scanner II scans the document line by line, and outputs an image signal. A recording sheet set on the facsimile machine 1 is fed to the plotter 13 at a predetermined speed by the RX-motor 12. The plotter 13 has a printing head in which a plurality of thermal elements are arranged in a line. The plotter 13 prints an image via an ink sheet on the recording sheet. The plotter 13 can also print the image on a thermal recording sheet. The image memory 14 can be constituted by any one or a combination of a hard disk unit, a optical disk unit, a large capacity memory, a DRAM (Dynamic RAM), a CMOS type of RAM. The image signal which is encoded by the encoder/decoder 9 is stored in the image memory 14.

In the facsimile machine having the above constitution, the remote control operation is activated based on the ID code (the password) supplied from a remote telephone terminal. Then, in the protecting process, the number of times that an erroneous ID code, different from the ID code stored in the RAM 4, is supplied from the remote telephone terminal is counted, and then when the number of times that the error ID code is supplied becomes a predetermined value, the remote control operation is locked so as to be prohibited from being activated by the ID code stored in the RAM 4. Thus, after that, the remote control operation based on the above ID code can not be carried out.

Figure 2:
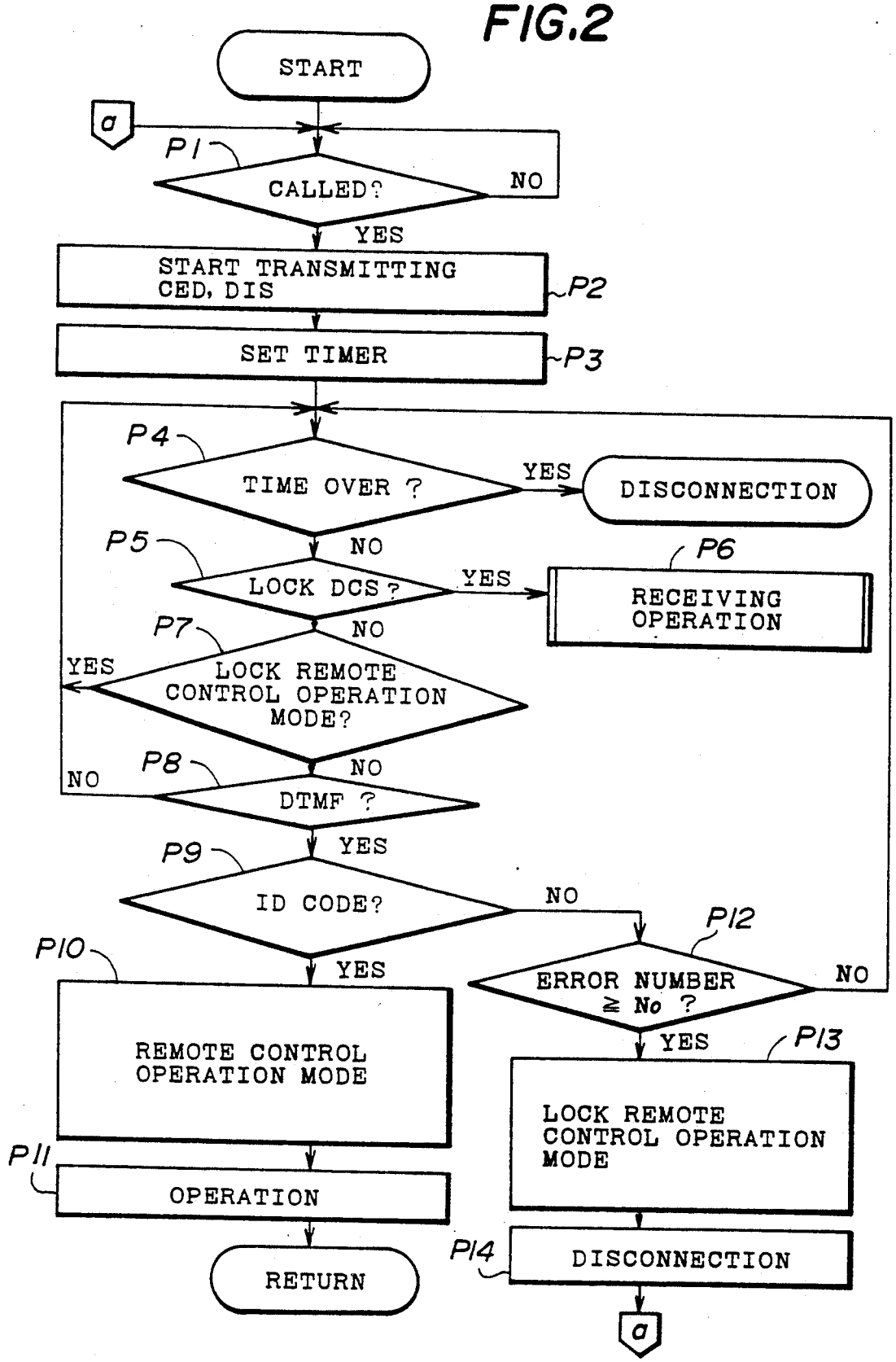
FIG. 2 is a flow chart illustrating a protecting process carried out along with a remote control operation in the facsimile machine shown in FIG. 1.

The above protecting process is carried out in accordance with the flow chart shown in FIG. 2.

Step $P_1$ is for determining whether or not the facsimile machine 1 is called. Under this condition, when a remote telephone terminal or a remote facsimile terminal calls this facsimile machine 1, step $P_1$ determines that the facsimile machine 1 is called. In response to this call, the facsimile machine 1 is switched to a receiving condition under which information can be received. Then, step $P_2$ starts transmitting a CED (Calling Station Identification) signal and a DIS (Digital Identification Signal) signal successively. After step $P_2$ transmits the DIS signal, step $P_3$ sets a predetermined time in a timer. The time set in the timer corresponds to a time that a party terminal requires for responding to the DIS signal and is $T_1$ defined in CCITT Recommendation T.30. While the timer is operating, step $P_4$ determines whether or not the time set in the timer is over and step $P_5$ determines whether or not a DCS (Digital Command Signal) signal is received as a response to the DIC signal. When step $P_4$ determines that the time is over (YES), the timer is reset and then a DCN (Disconnect) signal is transmitted from this facsimile machine 1 and this facsimile machine 1 is disconnected from the subscriber's telephone line L. When step $P_5$ determines that the DCS signal is received, step $P_6$ carries out a process for receiving information in a facsimile communication.

On the other hand, while step $P_5$ is determining that the DCS signal is not received, step $P_7$ determines whether or not a remote control operation mode has been locked. Then, step $P_7$ determines that the remote control operation mode has been locked, the process returns to step $P_4$ in which it is determined whether or not the time set in the timer is over. When step $P_7$ determines that the remote control operation mode has not been locked, step $P_8$ determines whether or not the DTMF signal is received, and step $P_9$ determines whether or not an ID code (a password) represented by the DTMF signal is equal to the ID code stored in the RAM 4. In a case where both ID codes are equal to each other, the result obtained by step $P_9$ is YES, and then the process proceeds to step $P_{10}$ so that a process in a remote control operation mode starts. Step $P_{10}$ receives an instruction of the remote control operation mode which is represented by the DTMF signal, and then step $P_{11}$ carries out the following process based on the instruction of the remote control operation mode.

A transmission function in which image information stored in the image memory 14 is transmitted to a specified destination, a storage function in which received image information is stored in the image memory 14, and a destination changing function in which a destination to which the image information is transmitted is changed, can be remotely activated or inactivated based on instructions supplied from the remote telephone terminal or the remote facsimile terminal. After the process in the remote control operation mode is completed, in steps $P_{10}$ and $P_{11}$, the process returns to step $P_1$ in which the facsimile machine 1 is waiting a call.

On the other hand, when step $P_9$ determines that the ID code supplied from the remote telephone (facsimile) terminal to the facsimile machine 1 is not equal to the ID code stored in the RAM 4, step $P_{12}$ determines whether or not the number of times that error ID codes each of which is not equal to the ID code stored in the RAM 4 have been received is greater than a predetermined reference number. When the number of times that the error codes are received becomes greater than the reference number, the result obtained in step $P_{12}$ is YES. In this case, it can be determined that there is a probability that the image information stored in the image memory 14 might be stolen. Thus, step $P_{13}$ prohibits the remote control operation mode in this facsimile machine 1 from being used. That is, the remote control operation mode is locked. Then, step $P_{14}$ transmits the DCN signal and disconnects this facsimile machine 1 from the subscriber's telephone line L. After the facsimile machine 1 is disconnected from the subscriber's telephone line, the process returns to step $P_1$.

After the remote control operation mode in this facsimile machine 1 has been locked, even if the facsimile machine receives the correct ID code equal to the ID code stored in the RAM 4, the remote control operation mode cannot be activated. That is, the ID code stored in the RAM 4 is prohibited from being used in this facsimile machine 1. All functions which can be activated by the remote control are prohibited from being used so that the image information stored in the image memory 14 is protected from being stolen.

After the remote control operation mode has been locked, for example, when a new ID code is rewritten by the user or a serviceman who examines the facsimile machine, the remote control operation mode which can be activated by the new ID code is reset in this facsimile machine 1.

According to the first embodiment, when the number of times that the erroneous ID codes are supplied to the facsimile machine becomes greater than the reference number, all functions which can be activated by the remote control are prohibited from being used in the facsimile machine. Thus the image information stored in the image memory can be prevented from being stolen. Thus, the security of the facsimile machine having remote control operation mode is improved.

A description will now be given of a second embodiment of the present invention with reference to FIGS. 3 and 4.

FIG. 3 shows a facsimile machine 21 according to the second embodiment. In FIG. 3, those parts which are the same as those shown in FIG. 1 are given the same reference numbers and omitted from the explanation.

Referring to FIG. 3, the facsimile machine 21 has a CPU 22, a ROM 23, a RAM 24, and an operation section 25. The CPU 22 sequentially carries out a process of a facsimile communication in accordance with programs stored in the ROM 23. The CPU 22 also carries out a protecting process, as will be described later. The ROM 23 stores various programs including a program in accordance with which the protecting process is carried out in a remote control operation mode. The RAM 24 has a working area which is used when the CPU 21 carries out various processes. The RAM 24 stores data of telephone numbers and names of destinations, and an ID code which is used for activating the remote control operation mode. The RAM 24 has a function for counting a number of times that error ID codes which are not equal to the ID code stored in the RAM 24 have been supplied to the facsimile machine 21. The protecting process is carried out with reference to the number of times that the error ID codes have been supplied to the facsimile machine 21. The operation section 25 has a ten key board and various key switches. An operator operates keys on the ten key board and/or the key switches so that various instructions are supplied to the facsimile machine. The operation section 25 supplies the instruction input thereby to respective parts of the facsimile machine. The operation section 25 has an LCD (Liquid Crystal Device) on which operation procedures, messages for describing functions in the facsimile machine 21, and the like are displayed.

In the facsimile machine 21 described above, the number of times that the error ID codes are supplied thereto is counted. Then when the count value reaches a predetermined reference value, the remote control operation mode is locked so that all functions which can be activated by the remote control are prohibited from being used in the facsimile machine 21. Further, when a correct ID code which is equal to the ID code stored in the RAM 24 is supplied before the count value reaches the reference value, the count value is reset to "0".

The protecting process is carried out in accordance with the flow chart shown in FIG. 4.

When the facsimile machine is called by a remote telephone terminal or a remote facsimile terminal, in response to the calling the facsimile machine 21 is switched to a receiving mode. Thus, step $S_1$ respectively starts transmitting a CED (Called Station Identification) signal and a DIS (Digital Identification Signal). Step $S_2$ determines whether or not a # code representing a requirement of the remote control operation is supplied from the remote telephone terminal to this facsimile machine 21. When step $S_2$ determines that the # code is not supplied to the facsimile machine 21, step $S_3$ determines whether or not a DCS (Digital Command Signal) is supplied to the facsimile machine 21. Then when step $S_3$ determines that the DCS signal is supplied thereto, a process proceeds to step $S_4$ in which a facsimile communication is carried out so that messages from another party are received. After step $S_4$, the protecting process is completed. When step $S_3$ determines that the DCS signal is not supplied thereto, the process returns to step $S_1$ in which the CED signal and the DIS signal are retransmitted.

On the other hand, when step $S_2$ determines that the # code is supplied thereto, step $S_5$ stops transmission of the CED signal and the DIS signal, and the facsimile machine 21 is waiting to obtain the ID code transmitted from the remote telephone terminal (facsimile terminal). When the ID code is supplied thereto, step $S_6$ determines whether or not the ID code supplied thereto is equal to the ID code stored in the RAM 24. When step $S_6$ determines that an erroneous code which differs from the ID code stored in the RAM 24 is supplied thereto, step $S_7$ transmits a NACK (negative acknowledgment) signal. Then, step $S_8$ increments an error counter by $+1$. The error counter is used for counting the number of times that the error ID codes are supplied to the facsimile machine 21. After step $S_8$, step $S_9$ determines whether or not a count value in the error counter is equal to or greater than "5". That is, in the second embodiment, the reference number used for determining whether or not the remote control operation mode is locked is set at "5". When step $S_9$ determines that the count value in the error counter is less than "5", the process returns to step $S_6$ in which a checking of the ID code is carried out. On the other hand, when step $S_9$ determines that the count value in the error counter is greater than or equal to "5", step $S_{10}$ prevents the ID code stored in the RAM 24 from being used in the facsimile machine 21 so that the remote control operation mode is locked. That is, all functions which can be activated by the remote control are prohibited from being used in the facsimile machine 21. After that, step $S_{11}$ transmits the DCN signal so that the facsimile machine 21 is disconnected from the telephone line L, and then the protecting process is completed.

When the remote control operation mode has been locked, a message for describing that the remote control operation mode is prohibited from being used is displayed on the LCD of the operation section 25. The operator of the facsimile machine 21 can know that the remote control operation mode is locked.

After the remote control operation mode has been locked, even if the facsimile machine 21 receives the # code or the correct ID code equal to the ID code stored in the RAM 4, the remote control operation mode can not be activated. That is, the ID code stored in the RAM 4 is prohibited from being used in this facsimile machine 21. All functions which can be activated by the remote control are prohibited from being used so that the image information stored in the image memory 14 is protected from being stolen.

On the other hand, in a case where the remote control operation mode can be activated, when step $S_6$ determines that the ID code received by the facsimile machine 21 is equal to the ID code stored in the RAM 24, step $S_{12}$ transmits an ACK (Acknowledgment) signal, and then step $S_{13}$ resets the error counter to "0". After step $S_{13}$, step $S_{14}$ activates the remote control operation mode so that the functions which are required to be carried out from the remote telephone terminal or the remote facsimile terminal can be activated by the remote control, and then the process is completed.

In the second embodiment, the number of times that the erroneous ID codes are received is maintained in the error counter. Thus, for example, in a case where three erroneous ID codes are supplied to the facsimile machine in succession, then the facsimile machine is disconnected from the telephone line, and then two erroneous ID codes are successively supplied thereto again, as the count value in the error counter becomes "5", the remote control operation mode in the facsimile machine is locked. Accordingly, when an unspecified user successively inputs erroneous codes to the remote telephone terminal in order to discover the correct ID code, the remote control operation mode is securely locked, so that the image information stored in the image memory can be securely kept secret.

In addition, since the message that the remote control operation mode is locked is displayed on the LCD in the operation section 25, the operator of the facsimile machine can easily know that the remote control operation mode has been locked due to an operation by an outsider. Further, when the correct ID code is supplied to the facsimile machine before the count value in the error counter reaches "5", the error counter is reset at "0". Thus, in a case where an input operation for inputting the ID code is erroneous, by inputting the correct ID code again, the remote control operation mode is prevented from being locked. Thus, it is easy for regular operators who know the correct ID code to activate the remote control operation mode in the facsimile machine.

That is, in the second embodiment, the reliability and the facility of the facsimile machine can be improved.

The present invention is not limited to the aforementioned embodiments, and variations and modifications may be made without departing from the scope of the claimed invention.

What is claimed is:

1. A communication apparatus having a remote control operation mode in which functions in said communication apparatus are remotely activated based on a predetermined code supplied from an external terminal, said communication apparatus comprising:
   storage means for storing the code;
   first determination means, coupled to said storage means, for determining whether or not an erroneous code which differs from the code stored in said storage means is supplied from the external terminal;
   counter means, coupled to said first determination means, for counting a number of times that the erroneous code is supplied from the external terminal based on a first determination result obtained by said first determination means;
   second determination means, coupled to said counter means, for determining whether or not the remote control operation mode can be activated based on the number of times counted by said counter means, and
   means, coupled to said counter means, for initializing said counter means when a correct code data which is equal to the code data stored in said storage means is supplied from the external terminal,
   wherein the remote control operation mode is prohibited from being used in said communication apparatus when said second determination means has determined that the remote control operation mode cannot be activated.

2. A communication apparatus as claimed in claim 1, wherein said second determination means has means for determining that the remote control operation mode cannot be activated when the number of times obtained by said counter means is greater than or equal to a predetermined number.

3. A communication apparatus as claimed in claim 1, wherein said communication apparatus is a facsimile machine.

4. A communication apparatus as claimed in claim 1, wherein said counter means has a counter which is incremented by one when said first determination means determines that the error code data is supplied from the external terminal.

5. A communication apparatus as claimed in claim 1, further comprising:
   means, coupled to said second determination means, for informing that the remote control operation mode cannot be activated when said second determination means has determined that the remote control operation mode cannot be activated.

6. A communication apparatus as claimed in claim 5, wherein said means has display means for displaying a message that the remote control operation mode cannot be activated.

7. A communication apparatus as claimed in claim 1, further comprising:
   reset means, coupled to said counter means, for resetting said counter means at a predetermined initial number when a correct code data which is equal to the code data stored in said storage means is supplied from the external terminal.

8. A communication apparatus as claimed in claim 1, wherein the number of times that the erroneous code is supplied from the external terminal is maintained in said counter means independently of a number of communications performed by said communication apparatus.

9. A communication apparatus having a remote control operation mode in which functions in said communication apparatus are remotely activated based on a predetermined code supplied from an external terminal, said communication apparatus comprising:
   storage means for storing the code;
   first determination means, coupled to said storage means, for determining whether or not an erroneous code which differs from the code stored in said storage means is supplied from the external terminal;
   counter means, coupled to said first determination means, for counting a number of times that the erroneous code is supplied from the external terminal based on a result obtained by said first determination means;
   second determination means, coupled to said counter means, for determining whether or not the remote control operation mode can be activated based on the number of times counted by said counter means;
   means, coupled to said counter means, for initializing said counter means when a correct code data which is equal to the code data stored in said storage means is supplied from the external terminal;

prohibition means coupled to said second determination means, for prohibiting the remote control operation mode from being activated in said communication apparatus when said second determination means has determined that the remote control operation mode cannot be activated, wherein while the remote control operation mode is prohibited from being activated, normal communications can be performed by said communication apparatus.

* * * * *